(No Model.)
W. TURNER.
DRAG SAW.
No. 437,532. Patented Sept. 30, 1890.
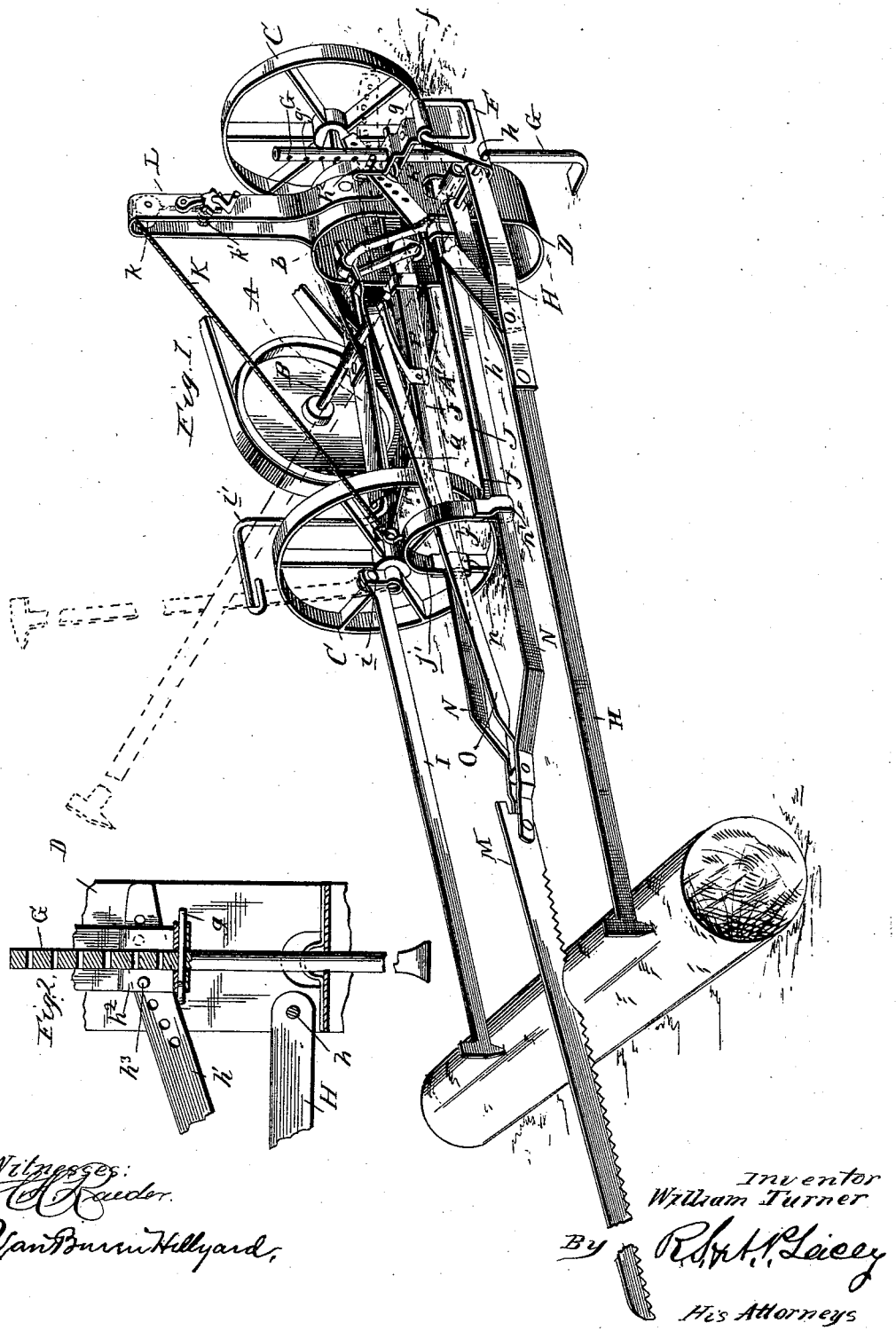
Witnesses:
Inventor
William Turner
By Robt. H. Lacey
His Attorneys

UNITED STATES PATENT OFFICE.

WILLIAM TURNER, OF VIOLA, IDAHO.

DRAG-SAW.

SPECIFICATION forming part of Letters Patent No. 437,532, dated September 30, 1890.

Application filed October 24, 1889. Serial No. 328,004. (No model.)

*To all whom it may concern:*

Be it known that I, WILLIAM TURNER, a citizen of the United States, residing at Viola, in the county of Nez Perces and Territory of Idaho, have invented certain new and useful Improvements in Drag-Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to drag-saws and aims to improve the general construction of the same, whereby the machine will be compact, comparatively light, durable, and efficient.

The improvement consists of the novel and peculiar construction and combination of the parts, which will be hereinafter more fully described and claimed, and which are shown in the annexed drawings, in which—

Figure 1 is a perspective view of a machine embodying my invention; Fig. 2, a detail view, showing the adjustable standard.

The frame comprises the rear beam A, front beam A', and oblique side bars $a$. The supporting-wheels C are mounted on spindles at the ends of the rear beam A. The crank-shaft B, journaled in suitable bearings on the front and the rear beams A and A', is projected at its front end and journaled in the crank-guard D, which is oval-shaped and secured at its rear side to the beam A'. The boxing F, projected from the front side of the crank-guide, receives the vertically-adjustable foot or standard G, which is held in an adjusted position by a pin $g$ passing through one of the series of openings $g'$ in the said standard and through a keeper $f$ on the said boxing. The dog H is mounted at its inner end on a pin $h$, which passes through the sides of the boxing F, and is adjustable at its outer end to the log to be cut, being held rigidly by the brace-bar $h'$, which passes through a keeper $h^2$ on the boxing, and a pin $h^3$, that passes through the keeper $h^2$, and one of a series of openings in the brace $h'$. The dog I is connected by clip $i$ with the wheel-spindle, and is held in an elevated position by the holder $i'$, which is secured to the beam A and overhangs the wheel.

The saw-guide frame J comprises two side bars $j\,j$, which are mounted at their inner ends on the axle B, and are united at their outer ends by the yoke $j'$, to which is secured the lifting-rope K, the other end of the said rope passing over a pulley $k$ on the standard L, which projects up from the crank-guard D and down around the windlass K', which is held from turning back by the usual ratchet and pawl. One side of the standard extends to and is connected with the beam A, thereby bracing the crank-guard.

The saw M is secured to the front ends of two guide-arms N, which project rearwardly and pass through guide-loops $n$ and $n'$ on the side bars of the saw-guide frame J. The front ends of the guide-arms N are brought together and connected with the saw and with the crank $b$ by the pitman O.

The guide-frame J is braced laterally by the brace P.

The operation of the invention can be readily understood from the foregoing description and the annexed drawings, and is as follows: When transporting the machine on the field, the draft-power is applied to the clevis $f^2$ on the boxing F, and the two dogs H and I are thrown up out of the way, as shown by dotted lines. Motion is imparted to the crank-axle by horse-power or other suitable motive power, the machine being steadied and braced by driving the pointed ends of the dogs in the log.

The front end of the machine is supported by the adjustable standard or foot G, which can be lengthened or shortened to adapt the machine to the ground.

The crank-guard protects persons from injury.

Having fully described my invention, what I claim, and desire to secure by Letters Patent, is—

1. The combination, with the frame, the saw, and the crank connected with the saw, of the dog connected by clip, and the wheel-spindle and the second dog connected by pin, with the front end of the frame and held in a fixed position by an adjustable brace, substantially as described.

2. The herein-described drag-saw, comprising the frame mounted on wheels, the crank-shaft, the crank-guard secured to the front beam of the frame and having a boxing, the adjustable standard or foot passing through the said boxing, the dog pivotally connected with said boxing and having an adjustable brace, the dog I, pivotally connected with the wheel-spindle, the holder i, for supporting said dog I, the guide-frame having lateral brace and guide loops, the saw-guide arms passing through the guide-loops and connected by pitman with the said crank, and the windlass connected with the said guide-frame, substantially as described.

In testimony whereof I affix my signature in presence of two witnesses.

WILLIAM TURNER.

Witnesses:
L. F. WILLIAMS,
R. S. BROWNE.